Figure 1:
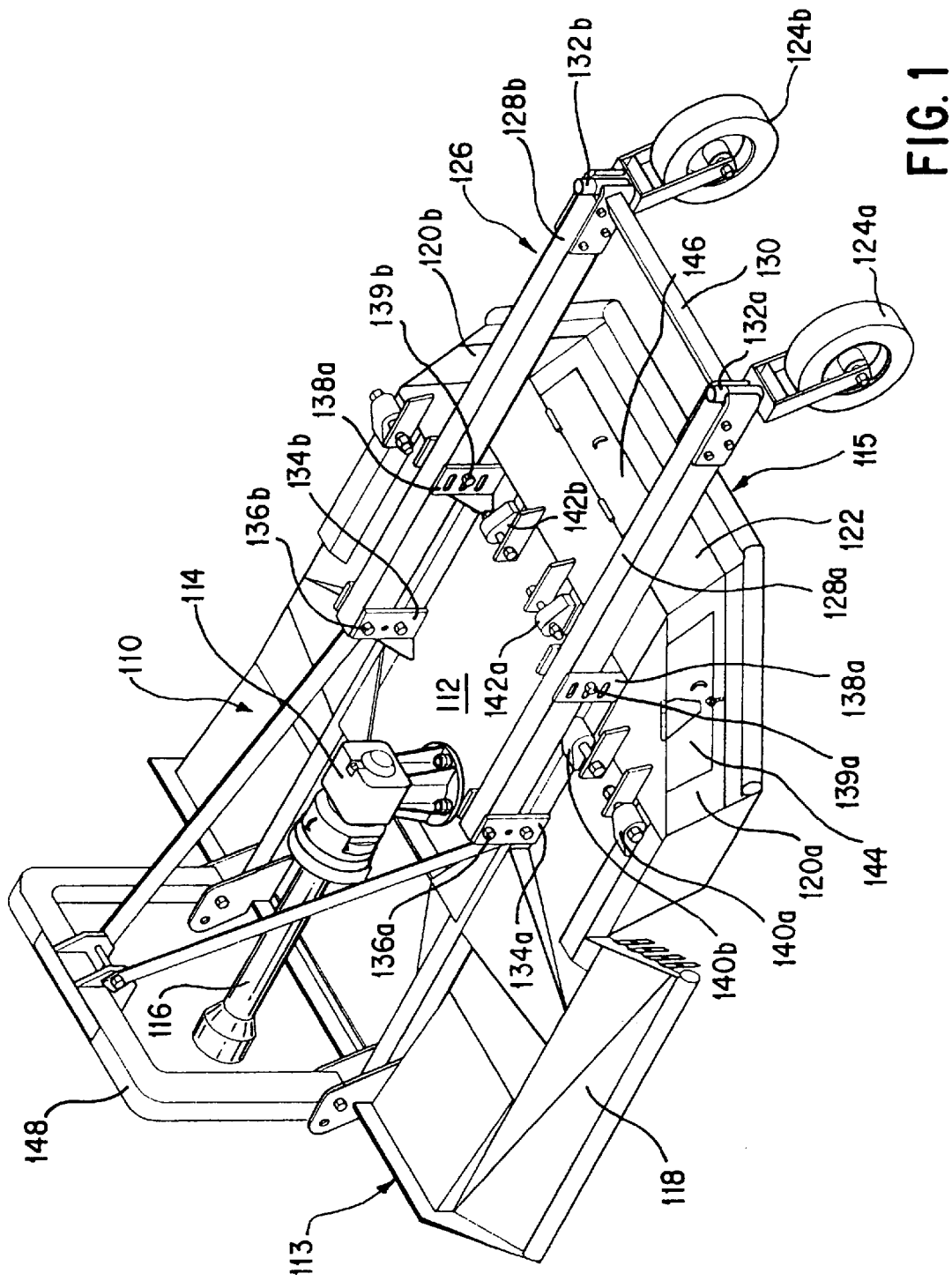

United States Patent

Thagard et al.

[19]

[11] Patent Number: 6,101,798
[45] Date of Patent: Aug. 15, 2000

[54] COMBINED RIGHT-OF-WAY MOWER AND CHEMICAL APPLICATION APPARATUS AND METHOD

[75] Inventors: Jeffrey B. Thagard, Ozark, Ala.; Mark J. Hulsey, Murrayville, Ga.

[73] Assignee: Southern Equipment Products Co., Inc., Dothan, Ala.

[21] Appl. No.: 09/124,116

[22] Filed: Jul. 29, 1998

[51] Int. Cl.[7] .................................................. A01D 35/12
[52] U.S. Cl. .............................. 56/16.8; 56/11.9; 239/121
[58] Field of Search .................................... 56/16.8, 16.7, 56/16.9, 16.4 R, 1, 12.1, 15.2, 255, 295, 320.1, 11.9; 239/172, 121, 170, 663

[56] References Cited

U.S. PATENT DOCUMENTS

| | | | |
|---|---|---|---|
| 3,866,397 | 2/1975 | Koziol | 56/1 |
| 4,821,959 | 4/1989 | Browning | 56/16.9 |
| 4,926,622 | 5/1990 | McKee | 56/16.8 |
| 5,329,752 | 7/1994 | Milbourn | 56/16.4 R |
| 5,385,306 | 1/1995 | Cervenka | 239/663 |
| 5,533,676 | 7/1996 | Conley | 239/663 |

OTHER PUBLICATIONS

A product information brochure entitled: "Burch Wet Blade™ and ... Flo–Thru Cell™, Dye Deposit On Cut Dog Fennel Stems As Applied With "Wet Blade" Equipment." ©1996.

Primary Examiner—Robert E. Pezzuto
Attorney, Agent, or Firm—Sterne, Kessler, Goldstein & Fox P.L.L.C.

[57] ABSTRACT

An apparatus and method for cutting vegetation and applying chemicals to the cut vegetation. The invention comprises a housing having a cutting blade rotatably mounted within the housing for cutting vegetation to a predetermined height above the ground. A member is mounted in the housing and disposed rearwardly of the cutting blade relative to the operational direction of travel of the apparatus such that when the apparatus is disposed on the ground in an operative condition, the member extends below the level of the cutting blade for forcing downwardly stubble remaining following the cutting operation. A sprayer is disposed in the housing rearwardly of the cutting blade relative to the operational direction of travel of the apparatus and oriented to spray chemicals onto the stubble after the stubble has passed behind the cutting blade. A scarifier is disposed in the housing rearwardly of the cutting blade relative to the operational direction of travel of the apparatus in the path of the stubble to score stubble with which the scarifier comes into contact. A brush is disposed in the housing rearwardly of the scarifier relative to the operational direction of travel of the apparatus to brush chemicals onto the scarified stubble.

41 Claims, 4 Drawing Sheets

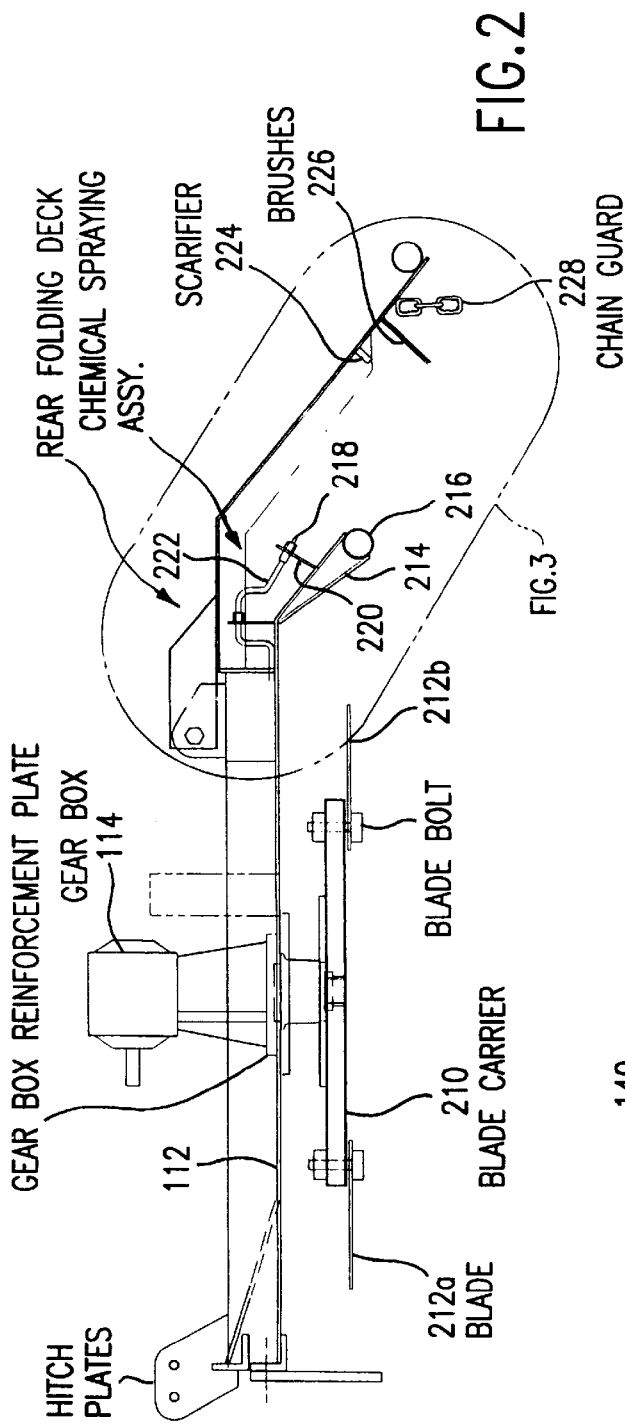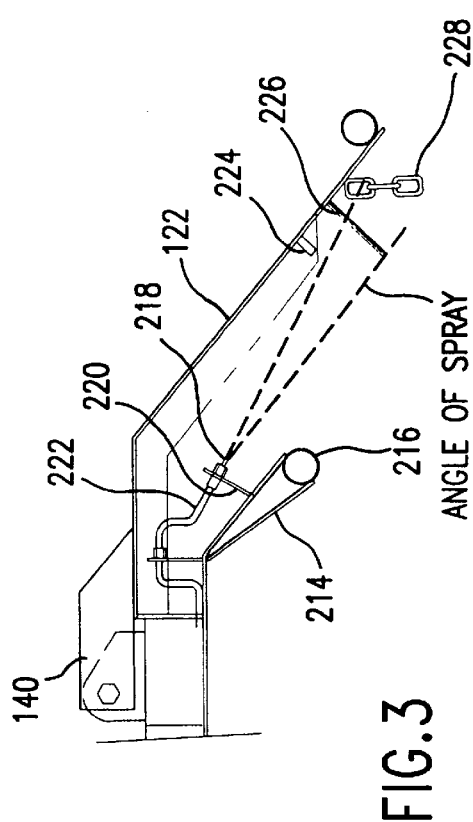

COMBINED RIGHT-OF-WAY MOWER AND CHEMICAL APPLICATION APPARATUS AND METHOD

FIELD OF THE INVENTION

This invention relates to right-of-way mowers and chemical applicators. More particularly, the invention relates to an apparatus and method for combining the operations of a right-of-way mower and a chemical applicator for applying chemicals, such as herbicides, to stubble remaining after the mowing operation has been performed.

BACKGROUND OF THE INVENTION

As society began to develop and build the infrastructure of this country, rights-of-way for roads had to be established. Then with the advent of electricity and other utilities, rights-of-way for power and telephone lines, and water, gas and oil pipelines, and the like, became necessary. Once a right-of-way is established, continuous maintenance is required. In the early days all maintenance was done by hand. As time passed, machinery, tools and equipment have been developed to fill the needs and requirements for right-of-way maintenance work.

In right-of-way maintenance, mowing is an expensive and labor intensive operation. The reason for this is that typically the area covered by the right-of-way was once forest. Trees and brush continually regrow after they are mowed. As a result, the right-of-way must be mowed every three to five years (this is referred to as the mowing cycle) in order to facilitate entrance, access, etc., to utility and roadside rights-of-way, forested areas, and anywhere brush, trees, grass, or other vegetation are considered to be a nuisance or are unwanted. Therefore, there is a very serious need to extend the mowing cycle in order to save save money and labor and to keep the rights-of-way in better condition, which will reduce the amount of wear and tear on other maintenance equipment.

For many years the industry has been using herbicides in an effort to extend the mowing cycle. Many different types of equipment and methods have been devised to apply chemicals in the right-of-way. However, with each new device or application method comes a new set of problems, many of which have yet to be solved. An early attempt to apply herbicides was with conventional agricultural sprayers. Other than structural failure, which could be solved with a redesign, the greatest problem was wind drift of the herbicide. When this happened the chemical would drift into the adjacent forest or private property adjoining the right-of-way and kill the trees in the forest or on the private property. This resulted in many law suits and cost the utility companies millions of dollars.

Presently the "Radial Arc Sprayer" is the most common method of applying herbicide to the right-of-way. A disadvantage of this apparatus is that the trees and brush must be allowed to regrow to about four feet tall before application of the herbicide. This leaves the right-of-way covered in a blanket of brown vegetation that is not only unappealing but is also detrimental to the environment. Since the vegetation never drops the dead leaves and the regrowth is much more dense than natural growth, the ground below is so shaded from sun light that grasses, flowering plants and seed bearing plants cannot grow. Without these plants, small animals, birds, etc. have no food source in the right-of-way. Therefore, no ecosystem can form there. In addition, since the chemical is held in the four feet of regrowth it cannot be mowed. If mowing is done at this point, only the portion of the growth to which the chemicals have been applied will be cut. As a result, the trees and brush bud out and grow again just as if they were never treated. Having this standing vegetation in the right-of-way makes other maintenance difficult and is detrimental to other maintenance equipment.

The condition most favorable for the utility company, aesthetic appeal and the environment is for the right-of-way to be mowed reasonably close to the ground and the vegetation to be treated in a manner that does not allow rapid regrowth. Early attempts at achieving this condition consisted of mowing the right-of-way, then following up soon with a soil activated herbicide. This procedure worked, as far as the condition of the right-of-way. However, the roots from trees and plants in the adjacent forest and in the lawns of adjacent residences typically extend into the right-of-way. Thus, these trees and plants are also killed by the soil activated chemicals. Again law suits have been filed and millions of dollars spent by the utility companies to settle these suits.

Devices have been developed that will mow the vegetation and apply herbicide under the mower deck directly to the stems. The herbicides used by these devices are "soil deactivated", which solves the problem of killing adjacent vegetation. Since the herbicide is applied under the deck, the problem of wind drift has been solved. There are generally two different designs of these machines. One drops a tiny stream of chemical onto the blade carrier of the mower, using the centrifugal force it creates to atomize and spread the chemical across the width of the mower. The other device pumps the chemical through the gearbox shaft and blade carrier and out an orifice associated with the mower blade. The rotation of the mower blade causes the chemical to be dispersed radially as it exits the orifice. This is intended to innoculate the end of the stem as it is being cut.

The problem with these devices is that herbicide is applied to all of the biomass, debris, etc. that passes through the mower. Since the herbicide used is "soil deactivated", only the chemical applied directly to the stem is of any effect while the remainder is destroyed by the soil. The small amount of chemical applied to the stem is not enough to give effective control. To alleviate this problem would require applying such a large amount of chemical as to be cost prohibitive. Also, that amount of chemical is outside label allowance and is prohibited by law.

What is needed is an apparatus and method for delivering an effective and legal predetermined or job specific amount of pesticide/herbicide directly to the stem of the nuisance vegetation with minimal waste.

SUMMARY OF THE INVENTION

This invention relates to an apparatus and method for cutting vegetation and applying chemicals to the cut vegetation. The invention comprises a housing having a cutting blade rotatably mounted within the housing for cutting vegetation to a predetermined height above the ground. A member is mounted in the housing and disposed rearwardly of the cutting blade relative to the operational direction of travel of the apparatus such that when the apparatus is disposed on the ground in an operative condition, the member extends below the level of the cutting blade for forcing downwardly stubble remaining following the cutting operation. A sprayer is disposed in the housing rearwardly of the cutting blade relative to the operational direction of travel of the apparatus and oriented to spray chemicals onto the stubble after the stubble has passed behind the cutting blade. A scarifier is disposed in the housing rearwardly of the cutting blade relative to the operational direction of travel of the apparatus in the path of the stubble to score stubble with which the scarifier comes into contact. A brush is disposed in the housing rearwardly of the scarifier relative to the operational direction of travel of the apparatus to brush chemicals onto the scarified stubble.

FEATURES AND ADVANTAGES OF THE INVENTION

The apparatus and method of this invention alleviates the problems mentioned above by means of the following:

A. Mowing with a specifically designed mower that has a side discharge feature, thereby reducing the amount of biomass, dirt, debris, etc., entering the pesticide/herbicide induction area.

B. As the cut stubble reaches the rear of the mower section it is bent over and forced down by the sloping rear portion of the mower deck, before entering the pesticide/herbicide application spray/inoculation chamber. The stubble returns to a standing position with a snap as it enters the spray/inoculation chamber, further cleaning and exposing the plant stubble for treatment while leaving the biomass, dirt, debris, etc. on or near the ground, well below the stem ends.

C. The stubble in the spray chamber is sprayed by precisely located spray nozzles, applying pesticide/herbicide to the basal and cadmium layer of the cut plants.

D. The standing stubble passes through the inoculation chamber which is a floating hood that is hinged at the front and is of similar shape as the mower deck in that it has a horizontal top and rear sloping surface. The hood is made in multiple sections mounted side by side to allow them to float with the contour of the ground and maintain constant pressure on the stubble as it passes under the sloped rear of the hood. The inoculation chamber is of sufficient length to give the stubble residency time in the spray path while being inoculated. The spray nozzles are placed in such a manner that only the top and one side of the stubble is inoculated with the spray.

E. When the stubble reaches the sloping rear of the hood it first comes in contact with a scarifier that rips and tears the bark on the side of the stubble that was not sprayed. Since the mowing action actually crushes the fibers of the plant, the pores and channels are somewhat obstructed. The upward tearing action of the scarifier opens many of the clogged channels on the untreated side of the stubble, allowing maximum penetration of the chemical that is applied by a brush mounted behind the scarifier on the sloped rear wall of the hood.

F. The brush is mounted directly in the spray pattern of the nozzles so that it catches and holds almost all of the over spray that passes by or over the stubble. As the stubble passes through the brush the chemical in the brush is applied to the scarified area just as paint is applied by a brush.

The apparatus of this invention addresses the problems mentioned in that:

1. The trees and brush in the right-of-way are mowed reasonably close to the ground, preventing an unappealing brown cover.
2. With the absence of a canopy, grasses, flowering, and seed bearing plants are allowed to flourish, thereby enhancing the development of an ecosystem in the right-of-way.
3. The chemical is sprayed under a hood, directly onto the stems and the brush at moderate pressure, trapping the spray and preventing wind drift.
4. Very good spray control is achieved since the chemical is applied directly to the stubble. Due to the spray pattern and the brush trapping the over spray allowing virtually none to go elsewhere, the stubble receives a much larger quantity and concentration of chemical than it would with other types of applicators while staying well within all label requirements.

BRIEF DESCRIPTION OF THE FIGURES

The features, objects, and advantages of the present invention will become more apparent from the detailed description set forth below when taken in conjunction with the drawings in which like reference characters identify corresponding elements throughout. Additionally, the left-most digit(s) of a reference number identifies the drawing in which the reference first appears.

FIG. 1 shows a top perspective view of the apparatus of this invention.

FIG. 2 shows a part sectional side view of the mowing and spraying chambers.

FIG. 3 shows a detail of the portion of the spraying chamber circumscribed by line C—C in FIG. 2.

FIG. 4 shows a partially exploded perspective view of the apparatus of the invention.

FIG. 5 shows side sectional view of the mowing and cutting chambers of the apparatus in an operative position.

DETAILED DESCRIPTION OF THE PREFERRED EMBODIMENTS

Preferred embodiments of the apparatus of the invention will be described in detail below. For ease and convenience of reference, the apparatus will be described in its operative position relative to the ground. Spatial orientations, such as front, rear, forward, back, top, bottom, and side, are provided in the context of the apparatus as it is disposed in its operative position relative to the ground and relative to its operational direction of travel as it is pulled over the ground to cut vegetation and apply chemicals, such as herbicides, to the remaining stubble left after the cutting operation.

FIG. 1 shows a perspective view of the apparatus of this invention. A housing 110 includes a housing deck 112. For ease of understanding, the housing deck will be considered to have a front portion 113 and a rear portion 115, such orientations being relative to the operational direction of travel. A gear box 114 is mounted to the top surface of the housing deck. As noted above, for purposes of understanding the invention, spatial orientations are given with respect to the operational orientation of the apparatus. That is, the spatial references have meaning only when the apparatus is disposed in its operational arrangement on the ground for cutting and spraying vegetation, as will be described in more detail below.

A gear box drive connector 116 couples gear box 114 in housing 110 to a driving source, such as the power take-off on a tractor, in a known manner.

In addition to deck 112, housing 110 includes sidewalls 118 on opposite sides of deck 112. One or both of sidewalls 118 may be angled outwardly to permit side discharge of dirt, debris, cuttings, etc. The advantage of this feature will be described below.

Rearwardly of sidewalls 118, housing 110 further includes angled end walls or hood members **120*a,b*** and a rear end wall or hood member 122. Hood members 120 and 122 extend downwardly and outwardly from housing deck 112 to near the ground, forming a hood for the spraying or inoculation chamber. This construction substantially prevents debris, cuttings, etc., from being thrown out and away from the apparatus in all and random directions. In addition, because the bottoms of end walls or hood members 120 and 122 float just above the ground, the chemical spray cannot escape from under the housing. Also, because the hood is formed in multiple sections, it floats with the contour of the ground. This has further advantages as will be described below.

The apparatus further includes trailing support wheels 124a,b which are mounted to a trailing wheel support frame 126. Support frame 126 includes support arms 128a,b, a transverse brace 130, and wheel mount pivot pins 132a,b. Pivot pins 132 mount support wheels 124 to support frame 126 in such a manner that wheels 124 can pivot about pivot axes through pivot pins 132 which are substantially perpendicular to the longitudinal axis of support arms 128.

Support frame 126 is mounted to housing 110 by a support frame mounting assembly. The support frame mounting assembly includes forward mounting brackets 134a,b, forward mounting bolts 136a,b, rear mounting brackets 138a,b, and rear mounting bolts 139a,b. Support arms 128 are bolted to mounting brackets 134 and 138 by means of mounting bolts 136 and 139, respectively. This arrangement allows trailing wheel support frame 126 to be pivotally raised about mounting bolts 136 merely by removing mounting bolts 139. The need to be able to swing trailing wheel support frame 126 up and out of the way will be described in more detail below.

Hood members 120 are pivotally mounted to housing deck 112 by hood member pivot mounts 140a, 140b, respectively. Similarly, hood member 122 is pivotally mounted to housing deck 112 by hood member pivot mounts 142a,142b, respectively. The pivoted mounting of hood members 120 and 122 to housing deck 112 permit hood members 120 and 122 to follow the contour of the ground while remaining close to the ground, thereby forming a protected spray chamber that prevents chemicals from escaping outside the spray chamber.

Hood members 120 each have a hinged access panel 144 formed therein. Similarly, hood member 122 has a hinged access panel 146 formed therein. The purpose of these access panels will be described below.

Finally, an A-frame hitch 148 is mounted to the forward end portion 113 of housing 110. Hitch 148 enables the mowing apparatus to be hitched to a pulling source, such as a tractor, in a known manner.

FIG. 2 shows a part-sectional view of the mowing apparatus. FIG. 2 shows a blade carrier 210 connected to gear box 114 in a known manner. Power supplied to gear box 114 through gear box drive connector 116 causes blade carrier 210 to rotate about a vertically aligned shaft. Cutting blades 212a,b are mounted to blade carrier 210 in a known manner.

Housing deck 112 terminates at its rear end portion in a downwardly-angled end member 214. At its distal end, member 214 terminates in a tube-like member 216. Thus, at its distal end, member 214 has a rounded end surface formed by tube-like member 216. Together, hood members 120 and 122 and downwardly extending member 214 define a spray or inoculation chamber 510 (see FIG. 5).

Figure 4:
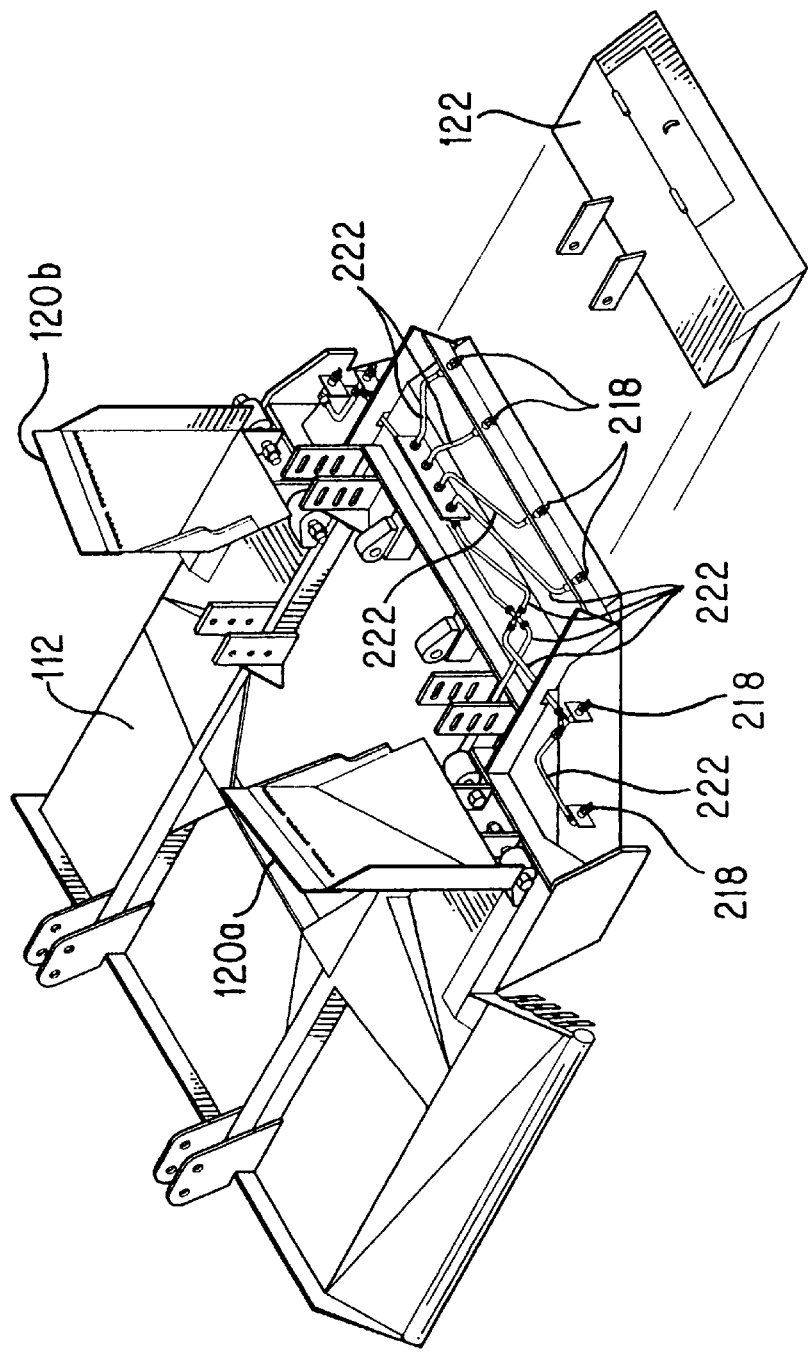

As shown in FIGS. 3 and 4, a series of spray nozzles 218 are secured by mounting brackets 220 to downwardly-angled end member 214. Alternatively, spray nozzles 218 may be mounted to the underside of hood members 120, 122. This latter arrangement permits the spray nozzles to float with the hood members so that the brushes will always remain in the spray path. Hoses 222 connect spray nozzles 218 to a fluid supply source (not shown). Nozzles 218 are oriented to spray fluid downwardly and rearwardly relative to the direction of forward travel of the apparatus into spray chamber 510.

A plurality of scarifiers 224 are mounted in housing 110 behind cutting blades 212. They may be mounted ahead of, behind or on downwardly angled end member 214 or on member 216. Scarifiers 214 may be located ahead of or behind spray nozzles 218. In a preferred embodiment, scarifiers 214 are mounted to the inner surfaces of hood members 120 and 122. Scarifiers 224 are knife-blade-like devices, the purpose of which will be described below.

A series of brushes 226 are mounted in housing 110. Brushes 26 may be mounted ahead of or behind scarifiers 224. Preferably and advantageously, brushes 226 are located downstream of scarifiers 224 relative to the operational direction of travel of the apparatus and are mounted to the inside surfaces of hood members 120 and 122.

Finally, chain guards 228 are mounted to the inside surfaces of hood members 120 and 122 downstream of brushes 226.

Figure 5:
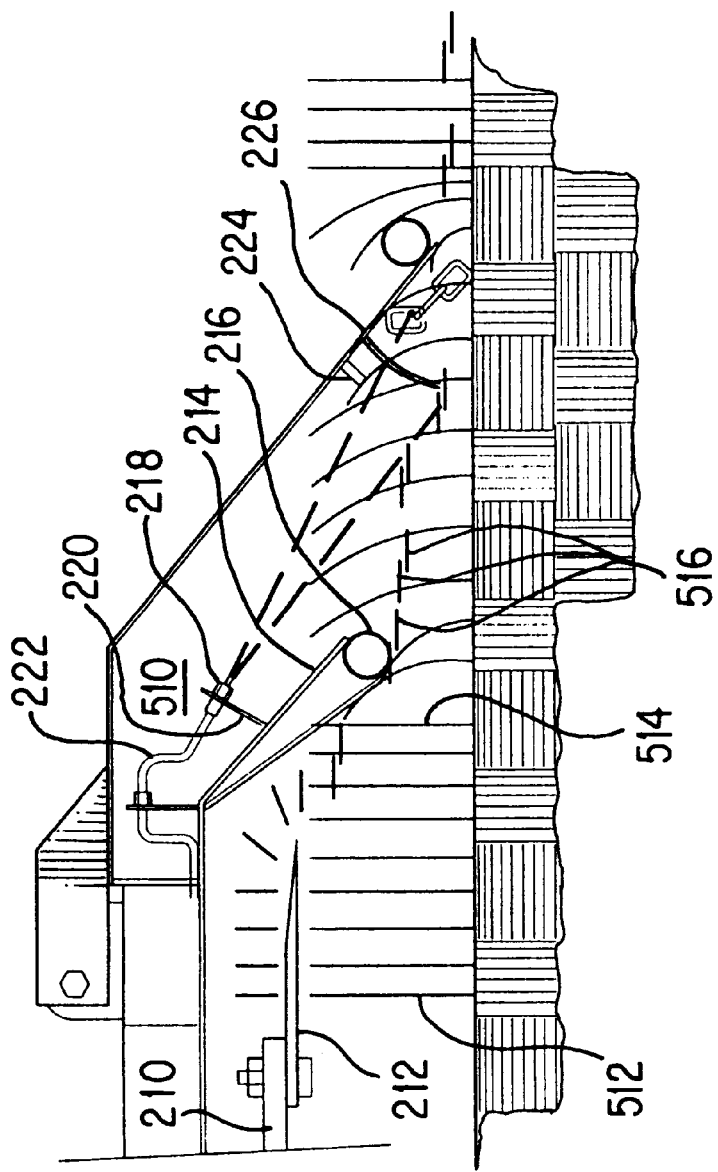

The operation of the cutting and chemical-applying apparatus of this invention will be described with particular reference to FIG. 5. As the mowing apparatus is pulled along the ground in a normal operative manner, blade carrier 210 and blades 212 rotate when driven by the power source to cut vegetation 512 in the path of blades 212. The side discharge feature causes the bulk of the cut tops 516, known as thatch, as well as dirt and other biomass to be ejected from the side of the mower before it enters inoculation or spray chamber 510, thereby reducing the amount of thatch, dirt, debris, and other biomass which is allowed to enter spray chamber 510.

Stubble 514 remaining under the mower housing after tops 516 of vegetation 512 have been cut brushes against end member 214 and is bent downwardly as it passes under member 214 and rounded end portion 216. This causes the cut tops 516 of vegetation 512, as well as other dirt, debris and other biomass to be shaken off stubble 514 so that only the stubble remains upstanding and unimpeded after it passes beyond end member 214 and into inoculation chamber 510. As the mowing apparatus continues to move forward, the stubble is brought into the spray path of spray nozzles 218. Nozzles 218 spray chemicals, such as herbicides, onto the upstanding stubble. The chemicals are sprayed by spray nozzles 218 onto the basal and cadmium layers of the cut plants or stubble. Spray nozzles 218 are oriented in such a manner that only the top and one side of the stubble are inoculated with the spray. Additionally, the spray is directed at an angle to the ground. This tends to maximize the residency time of the stubble in the spray path. Any spray that does not adhere to the stubble impinges on brushes 226. The advantage of this arrangement is discussed below.

The cut portion 516 of vegetation 512, known as thatch, is forced down toward the ground by end member 214 so that effectively, only the upstanding stubble 514 is passed through the chemical spray path. Because the thatch is at or close to the ground, only a minimal amount of chemicals are wasted on the cut thatch.

The standing stubble passes through inoculation chamber 510 as the mowing apparatus moves forward. The inoculation chamber includes that portion inside housing 110 between end member 214 and hood members 120 and 122. Inoculation chamber 510 is of sufficient length to give the stubble residency time while being inoculated. Hood members 120 and 122 together comprise a floating hood that is hinged at its front end. The multiple sections of the floating hood allow them to float with the contour of the ground and maintain constant pressure on the stubble as it passes under the sloped rear portions of hood members 120 and 122.

As the mowing apparatus continues to move forward, stubble 514 is forced against scarifiers 224. The knife-like blades of the scarifiers score the stubble. Specifically, as the stubble comes in contact with the scarifiers, the scarifiers rip and tear the bark on the side of the stubble that was not sprayed. The mowing action actually crushes the fibers of the plant. Thus, the pores and channels of the stalks are somewhat obstructed. The upward-tearing action of scarifiers 224 opens many of the clogged channels on the untreated side of the stubble. As the mowing apparatus continues to move forward, the scored stubble contacts brushes 226. Brushes 226 are located in the path of the chemical spray. Thus, the chemical which does not adhere to the stubble ultimately adheres to the brushes. Then, as stubble 514 contacts brushes 226, the chemicals are effectively painted onto the scored stubble on the side which was not sprayed. In this way, a maximum amount of desired chemicals are effectively applied to the stubble.

The stubble then exits from under the hood of the mower. Over time, the chemicals, such as herbicides, act on the stubble to cause it to wither and become dormant.

The ultimate effect of the operation of this invention is to apply a maximum amount of chemicals to the stubble in an effective manner that causes the chemicals to penetrate into the stubble and produce the maximum desired effect. A minimal amount of chemical is lost to ground or thatch, and essentially no chemical is wasted or thrown off to the side where it will harm residential trees or plants.

Periodically, it is necessary to gain access to the interior of inoculation chamber 510 to clean or adjust the spray nozzles, the scarifiers and the brushes. Access panels 144 and 146 are provided for this purpose. By raising one or more of the access panels, access can be had to the interior of the inoculation chamber. If major access to the interior of the spray chamber is needed, it is first necessary to raise support frame 126. This can be done by removing mounting bolts 139 and pivoting frame 126 upwardly about the pivot axis defined by mounting bolts 136. Hood member 122 can then be pivoted upwardly to allow access to the interior of spray chamber 510.

Although the apparatus is shown as a device to be towed behind a tractor or the like, it is clear that it could easily be modified to be an integral part of a self-contained riding mower. The only significant modifications needed would be to the drive train for the mower blades and the hitching apparatus. Such modifications would be well within the knowledge of one skilled in the mower design art.

In addition, various parts of the disclosed embodiments could be replaced by equivalent elements. For example, a semi-rigid panel or rake or comb-like member could be used to remove thatch from the stubble in place of downwardly extending end member 214. Also, a wiping pad, a sponge, or a permeable hose containing chemicals, etc., could be used in place of brushes 226. Still further, a scissor-type mower blade could be used in place of rotary blades 212.

Further, the invention was initially designed primarily for commercial right-of-way maintenance. However, it can be easily adapted for residential environments as a combination mower and liquid chemical applicator for lawns, golf courses, parks, etc. The necessary modifications would be well within the knowledge of one skilled in the mower design art.

While various embodiments of the present invention have been described above, it should be understood that they have been presented by way of example only, and not limitation. The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. Apparatus for cutting vegetation and applying chemicals to the cut vegetation, comprising:

a housing;

a cutting blade mounted within said housing for cutting vegetation to a predetermined height above the ground, the vegetation remaining after the cutting operation comprising stubble;

a sprayer disposed in said housing rearwardly of said cutting blade relative to the operational direction of travel of the apparatus and oriented to spray chemicals onto the stubble remaining following the cutting operation after the stubble has passed behind said cutting blade; and a stubble contacting member disposed rearwardly of said cutting blade relative to the operational direction of travel of the apparatus such that when the apparatus is disposed on the ground in an operative condition, said stubble contacting member extends below the level of said cutting blade for forcing downwardly the stubble remaining following the cutting operation.

2. Apparatus according to claim 1, wherein said housing contains a side discharge opening to permit cut vegetation to be ejected from a side of said housing relative to the operational direction of travel of the apparatus.

3. Apparatus according to claim 2, further comprising a brush disposed in the spray path of said sprayer to brush chemicals onto the stubble.

4. Apparatus according to claim 3, further comprising a scarifier disposed in said housing in the path of the stubble to score stubble with which said scarifier comes into contact.

5. Apparatus according to claim 4, wherein said scarifier is disposed in said housing rearwardly of said sprayer relative to the operational direction of travel of the apparatus.

6. Apparatus according to claim 1, further comprising a brush disposed in said housing rearwardly of said cutting blade to brush chemicals onto the stubble.

7. Apparatus according to claim 6, wherein said sprayer is oriented to spray the chemicals in the direction of said brush.

8. Apparatus according to claim 1, wherein said stubble contacting member is diposed forwarding of said sprayer relative to the operational direction of travel of the apparatus.

9. Apparatus according to claim 8, wherein said housing comprises a cover disposed rearwardly of said cutting blade relative to the operational direction of travel of the apparatus, said cover and said stubble contacting member together defining a spray chamber.

10. Apparatus according to claim 9, wherein said housing further comprises a housing deck to which said cutting blade is coupled, and wherein said cover comprises a plurality of cover members pivotably coupled to said housing deck to permit said cover members to conform to the ground over which the apparatus moves in an operative condition.

11. Apparatus according to claim 9, further comprising a scarifier disposed in said housing in the path of the stubble to score stubble with which said scarifier comes into contact.

12. Apparatus according to claim 11, wherein said scarifier comprises a plurality of knife-like members coupled to said cover and extending into said spray chamber to contact stubble as it passes through said spray chamber in an operative condition of the apparatus.

13. Apparatus according to claim 11, wherein said scarifier is disposed in said housing rearwardly of said sprayer relative to the operational direction of travel of the apparatus.

14. Apparatus according to claim 11, further comprising means disposed in said housing rearwardly of said scarifier relative to the operational direction of travel of the apparatus for applying chemicals onto the scarified stubble.

15. Apparatus according to claim 11, wherein said means for applying chemicals comprises a brush disposed in the spray path of said sprayer.

16. Apparatus according to claim 15, wherein said brush comprises a plurality of brush members coupled to said cover and extending into said spray chamber in the path of spray emitted from said sprayer.

17. Apparatus according to claim 15, wherein said scarifier and said brush are mounted to said cover and extend into said spray chamber.

18. Apparatus according to claim 1, wherein said sprayer comprises a plurality of spray nozzles.

19. Apparatus according to claim 1, further comprising a scarifier disposed in said housing in the path of the stubble to score stubble with which said scarifier comes into contact.

20. Apparatus according to claim 19, wherein said scarifier is disposed in said housing rearwardly of said sprayer relative to the operational direction of travel of the apparatus.

21. Apparatus according to claim 20, further comprising means disposed in said housing rearwardly of said scarifier relative to the operational direction of travel of the apparatus for applying chemicals onto the scarified stubble.

22. A method for cutting vegetation and applying chemicals to the cut vegetation, comprising the steps of:

(a) cutting vegetation to a predetermined height above the ground, the vegetation remaining after the cutting operation comprising stubble;

(b) passing the stubble remaining after step (a) into and through a spray chamber;

(c) forcing stubble remaining after step (a) downwardly to permit cuttings from the cut vegetation to fall to the ground; and (d) following step (c), spraying chemicals onto the stubble when the stubble is in the spray chamber.

23. A method according to claim 22, further comprising the step of:

(e) brushing chemicals onto the stubble while the stubble is in the spray chamber.

24. A method according to claim 23, further comprising the step of:

(f) scoring the stubble with a scarifier prior to step (e) to open the bark in the stubble to permit the chemicals applied in step (e) to gain access to the interior of the stubble.

25. Apparatus for cutting vegetation and applying chemicals to the cut vegetation, comprising:

a housing;

a cutting blade mounted within said housing for cutting vegetation to a predetermined height above the ground;

a stubble contacting member mounted in said housing and disposed rearwardly of the cutting blade relative to the operational direction of travel of the apparatus such that when the apparatus is disposed on the ground in an operative condition, said stubble contacting member extends below the level of the cutting blade for forcing downwardly stubble remaining following the cutting operation;

a sprayer disposed in said housing rearwardly of said cutting blade relative to the operational direction of travel of the apparatus and oriented to spray chemicals onto the stubble remaining following the cutting operation;

a scarifier disposed in said housing in the path of the stubble to score stubble with which said scarifier comes into contact; and means disposed in said housing rearwardly of said scarifier relative to the operational direction of travel of the apparatus to apply chemicals onto the scarified stubble.

26. Apparatus according to claim 25, wherein said stubble contacting member is disposed in said housing forwardly of said sprayer.

27. Apparatus according to claim 26, wherein said scarifier is disposed in said housing rearwardly of said sprayer relative to the operational direction of travel of the apparatus.

28. Apparatus according to claim 27, wherein said means disposed in said housing rearwardly of said scarifier comprises a brush disposed in the spray path of said sprayer.

29. Apparatus according to claim 28, wherein said housing comprises a cover disposed rearwardly of said cutting blade relative to the operational direction of travel of the apparatus, said cover and said stubble contacting member together defining a spray chamber.

30. Apparatus according to claim 29, wherein said housing further comprises a housing deck to which said cutting blade is coupled, and wherein said cover comprises a plurality of cover members pivotably coupled to said housing deck to permit said cover members to conform to the ground over which the apparatus moves in an operative condition.

31. Apparatus according to claim 29, wherein said scarifier and said brush are mounted to said cover and extend into said spray chamber.

32. Apparatus according to claim 31, wherein said sprayer comprises a plurality of spray nozzles oriented to spray chemicals into said spray chamber.

33. Apparatus according to claim 31, wherein said brush comprises a plurality of brush members coupled to said cover and extending into said spray chamber in the path of spray emitted from said spray nozzles.

34. Apparatus according to claim 31, wherein said scarifier comprises a plurality of knife-like members coupled to said cover and extending into said spray chamber to contact stubble as it passes through said spray chamber in an operative condition of the apparatus.

35. Apparatus for cutting vegetation and applying chemicals to the cut vegetation, comprising:

a housing;

a cutting blade mounted within said housing for cutting vegetation to a predetermined height above the ground, the vegetation remaining after the cutting operation comprising stubble;

a sprayer disposed in said housing rearwardly of said cutting blade relative to the operational direction of travel of the apparatus and oriented to spray chemicals onto the stubble remaining following the cutting operation after the stubble has passed behind said cutting blade; and means disposed in said housing rearwardly of said sprayer for applying chemicals onto the stubble.

36. Apparatus according to claim 35, wherein said means for applying chemicals is a brush.

37. Apparatus according to claim 35, wherein said means for applying chemicals is a scarifier that simultaneously scores the stubble and applies chemicals to the stubble.

38. Apparatus according to claim 35, further comprising a scarifier disposed in said housing rearwardly of said cutting blade to score stubble with which said scarifier comes into contact.

39. Apparatus according to claim 38, wherein said scarifier comprises a plurality of knife-like members.

40. Apparatus according to claim 38, wherein said means for applying chemicals is a brush and wherein said sprayer is oriented to spray the chemicals in the direction of said brush.

41. Apparatus according to claim 35, further comprising a stubble contacting member disposed rearwardly of said cutting blade relative to the operational direction of travel of the apparatus such that when the apparatus is disposed on the ground in an operative condition, said stubble contacting member extends below the level of said cutting blade for forcing downwardly the stubble remaining following the cutting operation.

* * * * *